United States Patent
Shi et al.

(10) Patent No.: US 11,410,459 B2
(45) Date of Patent: Aug. 9, 2022

(54) FACE DETECTION AND RECOGNITION METHOD USING LIGHT FIELD CAMERA SYSTEM

(71) Applicant: SHANGHAITECH UNIVERSITY, Shanghai (CN)

(72) Inventors: Zhiru Shi, Shanghai (CN); Minye Wu, Shanghai (CN); Wenguang Ma, Shanghai (CN); Jingyi Yu, Shanghai (CN)

(73) Assignee: ShanghaiTech University, Shanghai (CN)

( * ) Notice: Subject to any disclaimer, the term of this patent is extended or adjusted under 35 U.S.C. 154(b) by 43 days.

(21) Appl. No.: 16/894,032

(22) Filed: Jun. 5, 2020

(65) Prior Publication Data
US 2020/0302155 A1   Sep. 24, 2020

Related U.S. Application Data

(63) Continuation of application No. PCT/CN2018/119900, filed on Dec. 7, 2018.

(30) Foreign Application Priority Data

Dec. 8, 2017 (WO) ................ PCT/CN2017/115334

(51) Int. Cl.
*H04N 5/225* (2006.01)
*G06V 20/64* (2022.01)
(Continued)

(52) U.S. Cl.
CPC .......... *G06V 40/166* (2022.01); *G06V 20/64* (2022.01); *H04N 5/22541* (2018.08); *H04N 13/282* (2018.05); *H04N 2013/0081* (2013.01)

(58) Field of Classification Search
None
See application file for complete search history.

(56) References Cited

U.S. PATENT DOCUMENTS

| | | | |
|---|---|---|---|
| 2014/0043329 A1* | 2/2014 | Wang | G06K 9/00201 345/420 |
| 2014/0211077 A1* | 7/2014 | Ng | H04N 5/225 348/349 |

(Continued)

FOREIGN PATENT DOCUMENTS

| | | |
|---|---|---|
| CN | 102855471 A | 1/2013 |
| CN | 103996023 A | 8/2014 |

(Continued)

OTHER PUBLICATIONS

PCT International Search Report and the Written Opinion dated Feb. 27, 2019, issued in corresponding International Application No. PCT/CN2018/119900 (8 pages).

(Continued)

*Primary Examiner* — Idowu O Osifade
(74) *Attorney, Agent, or Firm* — Sheppard Mullin Richter & Hampton LLP

(57) ABSTRACT

A method of detecting and recognizing faces using a light field camera array is provided. The method includes capturing multi-view color images using the light field camera array; obtaining a depth map; conducting light field rendering using a weight function comprising a depth component and a sematic component, where the weight function assigns a ray in the light field with a weight; and detecting and recognizing a face.

10 Claims, 3 Drawing Sheets

(51) Int. Cl.
  *H04N 13/00* (2018.01)
  *G06V 40/16* (2022.01)
  *H04N 13/282* (2018.01)

(56) References Cited

U.S. PATENT DOCUMENTS

2016/0062151 A1* 3/2016 Fonte .................... B29D 12/02
                                                  351/204
2016/0316190 A1  10/2016 McCloskey et al.
2016/0344937 A1* 11/2016 Iwashita ............ G06K 9/00671
2019/0239314 A1*  8/2019 Sato ........................ H04R 1/028

FOREIGN PATENT DOCUMENTS

| CN | 105574525 A | 5/2016 |
| CN | 105975926 A | 9/2016 |
| CN | 106096474 A | 11/2016 |

OTHER PUBLICATIONS

Gross, Ralph et al., "Appearance-based Face Recognition and Light-Fields", IEEE Transactions on Pattern Analysis and Machine Intelligence, Apr. 30, 2004, vol. 26, No. 4.

Zhang, C., et al., "Light field photography and its application in computer vision", Journal of Image and Graphics, vol. 21, No. 3, 2016, pp. 263-281, with English language abstract.

* cited by examiner

FACE DETECTION AND RECOGNITION METHOD USING LIGHT FIELD CAMERA SYSTEM

CROSS-REFERENCE TO RELATED APPLICATIONS

This application is a continuation application of International Patent Application No. PCT/CN2018/119900, filed on Dec. 7, 2018, which is based on and claims priority of the International Patent Application No. PCT/CN2017/115334, filed on Dec. 8, 2017. The above-referenced applications are incorporated herein by reference in their entirety.

TECHNICAL FIELD

This specification relates to the field of computer technologies, and in particular, to a face detection and recognition method using light field camera system.

BACKGROUND

The light field can be seen as a field that is composed by a large amount of light flowing in every direction through every point in space. By recording the light field information of a scene, a post-processing of each light can be performed to get new information that are not available in 2D images, such as the image of an occluded person in a crowd. Based on the unique features of the light field, a novel occlusion face detection and recognition system is provided that could be useful in public areas, such as subway stations, railway stations, and airports.

SUMMARY

This specification provides a method of detecting and recognizing faces using a light field camera array. The method may include: capturing multi-view color images using the light field camera array; obtaining a depth map; conducting light field rendering using a weight function comprising a depth component and a sematic component, where the weight function assigns a ray in the light field with a weight; and detecting and recognizing a face.

In some embodiments, the method may further include recognizing a first ghosting face using a plurality of Haar features and an optimized Adaboost algorithm.

In some embodiments, the method may further include tracking the first ghosting face and a second ghosting face, and measuring a level of ghosting effect.

In some embodiments, the method may further include approximating a focal plane based on the level of ghosting effect.

In some embodiments, the method may further include conducting light rendering according to the focal plane.

In some embodiments, the depth map may be captured using a depth sensor.

In some embodiments, the depth map may be calculated based on the multi-view color images.

In some embodiments, the method may further include adjusting a detected face into a frontal face by transforming depth images into point cloud.

BRIEF DESCRIPTION OF THE DRAWINGS

The accompanying drawings described herein are used for providing further understanding for this specification and constitute a part of this specification. Exemplary embodiments of this specification and descriptions thereof are used for explaining this specification and do not constitute an improper limitation to this specification.

DETAIL DESCRIPTION OF SOME EMBODIMENTS

1. Light Field Camera Array System

Figure 1:
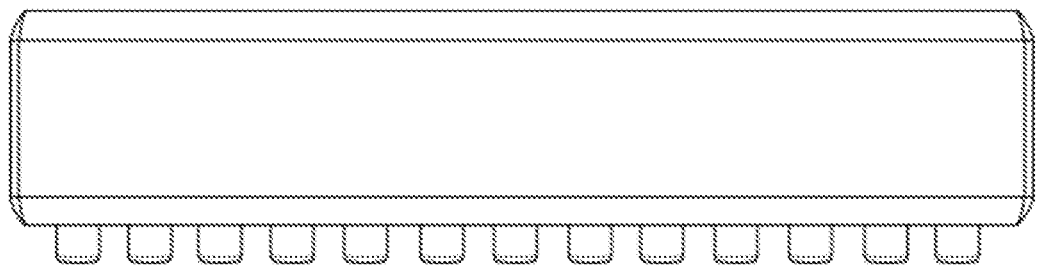
FIG. 1 shows a light field data capture system includes a light field camera array.

A light field data capture system is provided for capturing the light field information of the scene. The light field data capture system includes a light field camera array as shown in FIG. 1. In this system, RGB cameras are used to capture color information, and depth sensors are used to capture real-time depth information. Alternatively, the depth information can be obtained in other ways, such as by calculation based on the color images. In one embodiment, the RGB camera used in the system is the GS3-U3-51S5C camera made by the FLIR company, and there are 7 cameras in the system. It should be noted that the RGB cameras can be other type of cameras, and there could be different numbers of cameras in the system. In addition, the depth sensor used in the system is a Kinect sensor made by Microsoft. Similarly, the depth sensor can be other type of sensors as long as it can be used to obtain the depth information of the scene.

In one embodiment, the RGB cameras and the depth sensor are well aligned. The cameras are evenly spaced on a still aluminum alloy bracket, and the depth sensor is fixed on the center of this still aluminum alloy bracket. The distance between two adjacent RGB cameras is 0.2 meter in one embodiment, but the distance can be changed in other embodiments.

The camera used in one embodiment is the FLIR GS3-U3-51S5C camera, which has synced GPIO line connected to a signal generator. When the camera is capturing the RGB data, the data will be transferred to the computer in real time through a USB 3.0 cable. The data cable and control line used in this system is determined by the cameras, and they can be changed if different cameras are used.

The captured data will be transferred to a data processing system, which comprises a computer and a USB3.0 capture card. The cameras are connected to the capture card through a USB3.0 cable. Because the cameras generate a large amount of data, a light field data compression is performed, which takes into consideration the correlation between the sub-views.

Figure 2:
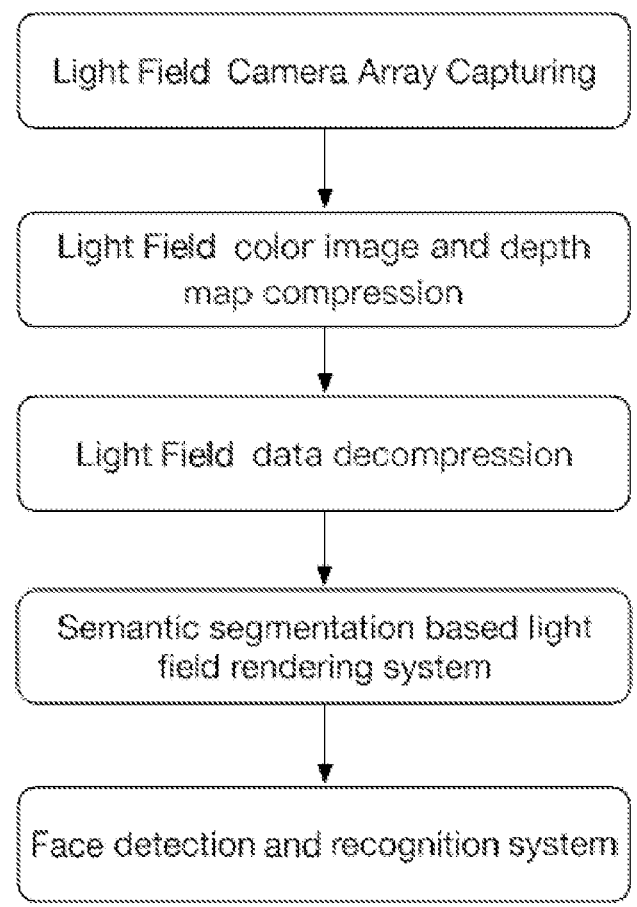
FIG. 2 shows a flowchart of the light field camera system and rendering system for face detection and recognition according to one embodiment of this specification.

When the multi-view color image and depth map are transferred to the data processing center, which can be a computer of significant processing power or a cloud server with GPU, the data will be decoded and processed by the light field rendering system. A semantic segmentation based light field rendering system is employed to provide high quality see-through effects. The method includes constructing a weight function having a depth component and a sematic component, where the weight function assigns a ray in the light field with a weight; and conducting light field rendering using the weight function. The technical of semantic segmentation is further disclosed in PCT Patent Application No. PCT/CN2017/111911, entitled "Semantic Segmentation Based Light Field Rendering", filed on Nov. 20, 2017, whose contents are hereby incorporated by reference in its entirety. The flowchart of the light field camera system and rendering system for face detection and recognition is shown in FIG. 2.

Through the light field rendering system, a set of clear images of different focal plane are obtained. The refocus image obtained from light field data have the tendency that an object in light field will have ghosting effects if it is not on the focal plane, which means the object's multiple images will overlap. These artifacts will make the face detection algorithm less effective, or even fail.

Figure 3:
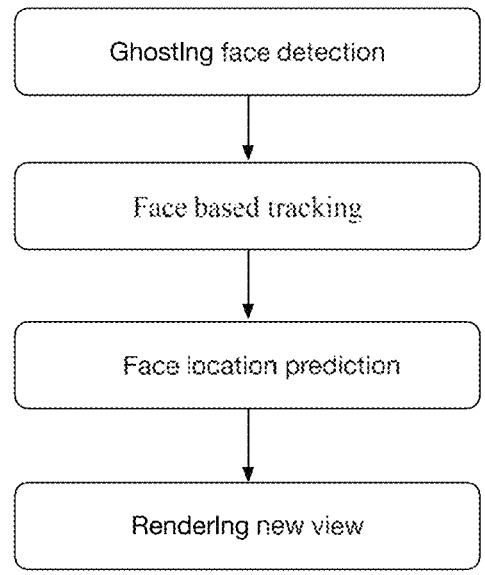
FIG. 3 shows a flowchart of the overall process of a method of detecting and recognizing faces using a light field camera array according to one embodiment of this specification.

Traditional face detection algorithm can only detect clear faces that are focused, but in light field system, the faces will not be clear all the time. As a result, traditional face detection algorithms do not work well in light field system. The face detection approach in accordance with embodiments of the present disclosure extracts more information from the ghosting image than the traditional face detection algorithm. The overall process is shown in FIG. 3.

1.1 Ghosting Face Detection in Light Field Image.

Our ghosting face detector use Haar features and trained by Adaboost algorithm on ghosting face, so that our detector can recognize ghosting face that traditional approach cannot. We use sliding windows to fed each patch of images into our ghosting face detector to determinate whether it is the ghosting face. The algorithm is further optimized for better results.

1.2 Face Based Tracking

Individual ghosting faces are tracked on sequence, and the level of ghosting effect is measured. Real-time tracking algorithm is used to track each ghosting face instance.

A modified version of ECO tracking algorithm is used in the real-time tracker. It is assumed that there are N image views in the light field camera system. Each view is represented as $C_i$, $I_i$ represent the corresponding image. Once a ghosting face is detected for the first time, a bounding box $B_i=(x_i, y_i, w_i, h_i)$, where $x_i$, $y_i$ is the coordinate of top-left corner in image, $w_i$, $h_i$ is the width and height of bounding box, i is the id of view, is established.

The first process of tracking is feature extraction. We can crop out image patches according to the bounding boxes. $I'_i$ represents an image patch of view i. Then, feature extractor F conducts feature extraction on $I'_i$ which is:

$x_i = F(I'_i)$

Where $x_i$ is the extracted feature maps with D channels. In fact, F is consisted of multiple algorithms in order to be a feature extractor. It can be considered as a combination of algorithms. For example, convolutional network and FHOG algorithm are suitable for feature extraction. In practice, the $6^{th}$ layer's output of VGG-16 ($F_1$) and FHOG $F_2$ are used to form the feature extractor.

$F(I'_i) = F_1(I'_i) \cup F_2(I'_i)$

The output resolutions of $F_1$ and $F_2$ are not the same, and a feature interpolation process is needed to resize these feature maps into the same size.

We define an interpolation function $J_d: \mathbb{R}^{N_d} \rightarrow L^2(t)$ to process these feature maps $$J^d\{x^d\}(t) = \sum_{n=0}^{N_d} x^d[n] b_d\left(t - \frac{T}{N_d} n\right)$$

Where $x^d$ means the d-th kind of feature map, $b_d$ is bicubic interpolation filter. This formula can transform information from spatial domain to other domain, such as frequency domain.

Secondly, these features are used to localize the face being tracked. We know the bounding box of initial frame, and we need to know where is the object in the next frame. But first of all, the features in initial frame are used to train a correlation filter which helps to localize the same object in next frame.

Correlation filter is represented as f, $f=(f^1, f^2, \ldots, f^D)$. Using bounding box information and feature extractor, we can obtain feature maps $J_i=(J_i^1, J_i^2, \ldots, J_i^D)$ in view i. A score map can be calculated by using correlation filter:

$$S_i\{x\} = f * J_i = \sum_{d=1}^{D} f^d * J_i^d$$

Where * means the convolution operator. There is a formulation in frequency domain:

$$\widehat{S_i\{x\}}[k] = \sum_{d=1}^{D} \hat{f}^d[k] \hat{J}_i^d[k]$$

Obviously, $s_i(t) = \mathcal{F}^{-1}(\widehat{S_i\{x\}}[k])$, $\mathcal{F}^{-1}$ is the inverse Fourier transform.

In this definition, the desired object is located on the highest score in score map. The same filter is used to filter different feature maps from different views, which will make filter more robust if the object is deformed.

After finishing face localization, the training samples are updated. Training sample set is for training correlation filter. The samples are collected from a time period, if a training sample in training sample set is from long time ago (like 5 seconds ago in video), this sample will be purged. Current feature maps will be added into training sample set.

In order to train the correlation filter, we build up the following objective function:

$$E(f) = \sum_{j=1}^{M} a_j \|S_i\{x_j\} - y_j\|_{L^2}^2 + \sum_{c=1}^{C} \|wf\|^2$$

Where M is the number of training samples from different views in our light field camera system. $a_j$ is the weight for each view, w is the regularization coefficients. We are going to train a single filter which can find the object in different view. This kind of train strategy can find out the invariance property in feature maps of different views.

Figure 4:
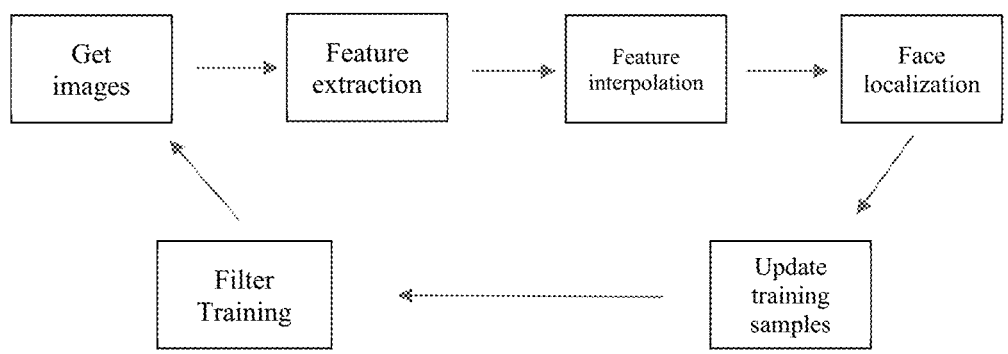
FIG. 4 shows a schematic diagram showing a face tracking pipeline according to one embodiment of this specification.

The pipeline of face tracking is shown in FIG. 4.

1.3 Face Location Prediction

Now we have the face location for each view, which means we can use light field rendering algorithm to assign the face location in target view. So, in the target view, we have multiple face tracking trajectories for different views. According to the level of ghosting effect change process, the location of all focus face pattern will be predicted. All these trajectories will intersect at a same position. Meanwhile approximate focal plane will be calculated. According to the trajectories and motion of each instance, we can predict the intersection of it.

In order to predict the intersection, we use speed estimation method here. First, we calculate the current speed by using latest 3 trajectories points, $p_1$, $p_2$ and $p_3$. So the speed is calculated:

$$v = \frac{1}{4} \cdot \left( \frac{p_1 - p_2}{\|p_1 - p_2\|} + \frac{p_2 - p_3}{\|p_2 - p_3\|} \right) \cdot (\|p_1 - p_2\| + \|p_2 - p_3\|)$$

Accumulating trajectories by using current speed, we can predict trajectories in next few frames. If predicted trajectories have an intersection, that is what we want.

This intersection means the location of all focused face. Now we obtain its locations in different view, then triangulate these corresponding points we get approximate focal plane.

1.4 Rendering New View

To render a new view, a new focal plane is put according to calculation, and the faces around predicted locations are predicted at corresponding time, and light rendering is conducted according to new focal plane at the predicted time.

2. Light Field Based Face Alignment

Figure 5:
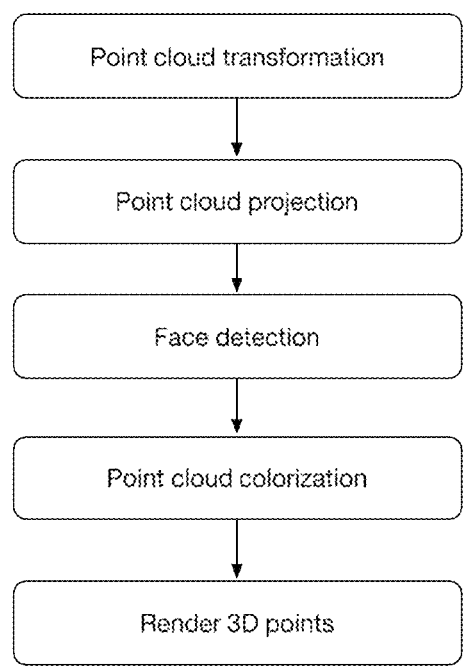
FIG. 5 shows a flowchart of aligning faces using the raw image data and corresponding depth data from light field camera array system according to one embodiment of this specification.

The big challenge for using the above method to detect face is that when the face does not directly face the camera, the detected faces are not all frontal faces. To get a better result, face recognition algorithm need a well-posed face to recognize the face image. To get a better recognition result, we proposed a novel face alignment in light field camera which can adjust detected faces into frontal faces. In order to align faces, we use the raw image data and corresponding depth data from light field camera array system, and do following steps as shown in FIG. 5:

1. Transform all depth images into point cloud. Using calibrated depth cameras, depth value of each pixel can be projected in to 3D world coordinate as a point by using the intrinsic and extrinsic matrix of calibrated depth cameras.
2. Project point cloud into all color cameras and virtual camera. we firstly calibrate all cameras and obtain their intrinsic and extrinsic matrices, then use them in Projection. But different from traditional method, we up sample all depth image by using bilinear interpolation, then do the projection.
3. Run light field camera face detection algorithm in current scene at this time, and obtain face orientation. Do light field face detection algorithm, we obtain the location and orientation of faces.
4. Point cloud colorization. For each detected face in virtual rendered camera, obtain its pixel's depth. Trace these 3D points in all color cameras according to camera calibration data, then access color pixel value from color camera and blend pixels which pass the depth test.
5. Use face orientation information from face detection, rotate the 3D face point cloud to frontal pose, Then render it. We now have face color point cloud in 3D world, just do rendering according to its orientation. Put render camera in that place.

This concludes the descriptions for specific embodiments of this description. Other embodiments may fall within the scope of the appended claims. In some embodiments, the steps recorded in the claims may be performed in different sequences and an expected result may still be achieved. In addition, the processes depicted in the accompanying drawings do not necessarily require specific sequences or consecutive sequences to achieve an expected result. In some embodiments, multitask processing and parallel processing may be advantageous.

The foregoing descriptions are merely embodiments of this specification and are not intended to limit this specification. For a person skilled in the art, various modifications and variations can be made to this specification. Any modification, equivalent replacement, or improvement made without departing from the spirit and principle of this specification shall fall within the scope of the claims of this specification.

The invention claimed is:

1. A method of detecting and recognizing faces using a light field camera array, comprising:
   capturing multi-view color images using the light field camera array;
   obtaining a depth map;
   conducting light field rendering using a weight function comprising a depth component and a sematic component, where the weight function assigns a ray in the light field with a weight;
   detecting and recognizing a face;
   recognizing, based on the multi-view color images and the depth map, a first ghosting face associated with the face;
   measuring, based on the first ghosting face, a level of ghosting effect of the face, the level of ghosting effect associated with a focal plane of the face; and
   determining, based on the level of ghosting effect, an approximated focal plane of the face.

2. The method of claim 1, wherein recognizing the first ghosting face associated with the face comprises:
   recognizing the first ghosting face using a plurality of Haar features and an optimized Adaboost algorithm.

3. The method of claim 2, wherein measuring the level of ghosting effect of the face comprises:
   tracking the first ghosting face and a second ghosting face associated with the face; and
   measuring the level of ghosting effect based on the first ghosting face and the second ghosting face.

4. The method of claim 1, further comprising conducting light rendering of the face according to the focal plane.

5. The method of claim 1, wherein the depth map is captured using a depth sensor.

6. The method of claim 1, wherein the depth map is calculated based on the multi-view color images.

7. The method of claim 3, wherein tracking the first ghosting face and the second ghosting face comprises:
   tracking the first ghosting face and the second ghosting using a modified version of ECO tracking algorithm.

8. The method of claim 1, wherein the light field camera array comprises a plurality of cameras each producing one of the multi-view color images, the plurality of cameras evenly-spaced.

9. The method of claim 8, further comprising:
   performing a face alignment process, by:
     transforming depth images associated with the face into a point cloud comprising a plurality of points;

projecting the plurality of points into each of the plurality of cameras and a virtual camera associated with a target view;
obtaining a face orientation of the face with respect to the target view; and
rotating, based on the face orientation, the point cloud to obtain an aligned face, wherein the aligned face has a frontal pose with respect to the target view.

10. The method of claim 9, wherein detecting and recognizing the face comprises:
    detecting and recognizing the face based on the aligned face.

\* \* \* \* \*